US012632764B2

(12) United States Patent
Orús Lacort et al.

(10) Patent No.: US 12,632,764 B2
(45) Date of Patent: May 19, 2026

(54) QUANTUM TREND-DETECTION ALGORITHM

(71) Applicant: Multiverse Computing S.L., Donostia / San Sebastián (ES)

(72) Inventors: Román Oscar Orús Lacort, San Sebastian (ES); Jesus Enrique Lizaso Olmos, Matadepera (ES); Rodrigo Hernandez, San Sebastian (ES)

(73) Assignee: MULTIVERSE COMPUTING S.L., Donostia / San Sebastián (ES)

( * ) Notice: Subject to any disclaimer, the term of this patent is extended or adjusted under 35 U.S.C. 154(b) by 1043 days.

(21) Appl. No.: 17/742,477

(22) Filed: May 12, 2022

(65) Prior Publication Data

US 2023/0368062 A1 Nov. 16, 2023

(51) Int. Cl.
*G06N 10/60* (2022.01)
*G06F 17/11* (2006.01)
(Continued)

(52) U.S. Cl.
CPC ............. *G06N 10/60* (2022.01); *G06F 17/11* (2013.01); *G06N 10/40* (2022.01); *G06Q 10/04* (2013.01)

(58) Field of Classification Search
CPC ........ G06F 17/00–40; G06Q 10/00–30; G06N 10/00–80; G06N 3/08; G06N 3/063;
(Continued)

(56) References Cited

U.S. PATENT DOCUMENTS

2012/0045136 A1* 2/2012 Rose ...................... G06N 10/60
382/209
2017/0286852 A1* 10/2017 Rezaie ................... G06Q 50/01
(Continued)

FOREIGN PATENT DOCUMENTS

CN 112016036 A 12/2020
WO 2018/118982 A 6/2018
WO 2021/072221 A1 4/2021

OTHER PUBLICATIONS

Mugel, Samuel, et al. "Dynamic Portfolio Optimization with Real Datasets Using Quantum Processors and Quantum-Inspired Tensor Networks." arXiv.Org, Jun. 30, 2020, arxiv.org/abs/2007.00017v1. (Year: 2020).*
(Continued)

*Primary Examiner* — Andrew Caldwell
*Assistant Examiner* — Huy Duong
(74) *Attorney, Agent, or Firm* — 24IP Law Group USA, PLLC; Timothy R DeWitt

(57) ABSTRACT

A computer-implemented method and system for identifying trends in a network of elements. The method comprises obtaining a plurality of properties for the elements in the network, creating a multi-dimensional configuration space from the measured plurality of properties and storing the multi-dimensional configuration space in data storage. A cost function which is representative of the trends in the network is then built and the cost function is passed to a quantum processor for solving to identify a minimum in the cost function. The identified minimum is processed extract in a central processing unit the trends from the identified minimum. The cost function has one or more components which are representative of interaction between different elements in the network.

10 Claims, 2 Drawing Sheets

(51) Int. Cl.
    *G06N 10/40*        (2022.01)
    *G06Q 10/04*        (2023.01)

(58) Field of Classification Search
    CPC ........ G06N 3/0895; G06N 3/09; G06N 3/091;
                  G06N 3/092; G06N 3/094; G06N 3/096;
                         G06N 3/098; G06N 3/0985
    See application file for complete search history.

(56)                  References Cited

U.S. PATENT DOCUMENTS

2021/0008995 A1    1/2021  Lee et al.
2021/0133618 A1*  5/2021  Cao ........................... G06J 1/02

OTHER PUBLICATIONS

Hao, Tianyi, et al. "A Quantum-Inspired Tensor Network Algorithm for Constrained Combinatorial Optimization Problems." Frontiers, Frontiers, Sep. 19, 2025, www.frontiersin.org/journals/physics/articles/10.3389/fphy.2022.906590/full. (Year: 2025).*
Pistoia, et al., "Quantum Machine Learning for Finance", Future Lab for Applied Research and Engineering, JPMorgan Chase Bank, N.A., Sep. 9, 2021.

* cited by examiner

QUANTUM TREND-DETECTION ALGORITHM

CROSS-REFERENCE TO RELATED APPLICATIONS

None

BACKGROUND OF THE INVENTION

Field of the Invention

The field of the invention relates to a method and system for identifying trends in data.

Brief Description of the Related Art

The amount of data and information obtained on networks has increased substantially in the past few years. Examples of these networks include, but are not limited to, social media networks in which participants exchange information with each other, networks for the Internet of Things with sensors for measuring interrelated physical parameters, or financial networks for financial instruments, such as currency markets or stock exchanges, in which trades in one type of financial instruments affect the pricing and trade in other types of financial instruments.

Organizations have developed various methods to monitor this information and data and to use the data and the information to draw and act on conclusions from the data. For example, an organisation monitoring a social network may wish to monitor promotion of brands on the networks by influencers and "ordinary" participants in the social network using trend indicators. Banks and other financial organisations may wish to model economies to determine whether economic intervention is necessary to re-adjust an economy. Manufacturing industries may wish to use their sensor data to optimise production based on trends in pricing of raw materials and/or pricing of manufactured goods.

There are numerous examples of such systems in which parameters representing the data or the information can be continuously measured. These parameters are not static, and the values of the parameters are also dependent on the values of other ones of the parameters in the system. Calculation of trends within such a system is highly complex and resource intensive. It is well-known that an increase in the number of measured parameters increases the understanding of the operation of the system. This increase, however, results in an exponential increase in the amount of processing time. The limitation of current computing systems means that the number of parameters measured needs to be limited. The limitation of the number of measured parameters will often lead to a resulting loss in the insights into the system that can be extracted from the measurements of such parameters.

There are a number of prior art documents illustrating methods for analysing trends in data. For example, international patent application No WO2018/118982 (Estia, Inc.) teaches a method for analyzing time series data associated with networks, e.g., social networks, and subsequently publishing information that is associated with a category within the network. The method described in the WO982 publication involves a social media network and teaches receiving a first set of data points by a processor. The data points indicate a number of items published on a network during a time period. The items are associated with a category. A model is created and trained using a training set to describe a time series of the first set of data points. The model is employed to determine a predicted number of items that are published on the network during a subsequent time period, associated with the category. The category can be for example a brand of a product or a service or a more generic type of service. The information that is associated with the category is subsequently published by the processor within the network, based on the predicted number of items, by the processor. The information targets set of users to receive the subsequently published information relating to the category within the network. The model is created using techniques, such as a least means square algorithm, a normalized least mean square algorithm, or a recursive least squares algorithm.

A mathematical model to describe an online social network is taught in Chinese Patent Application No. CN 112016036 A (Harbin Univ).

US Patent Application No US 2021/0089953 (Microsoft) teaches a so-called quantum AI prediction system for predicting data bits in a time-sequential sequence of data points. The prediction system comprises a quantum prediction circuit adapted to receive an input vector representing a subset of the time-sequential sequence, encode the input vector as a corresponding qubit register, apply a trained quantum circuit to the qubit register; and measure one or more qubits output from the quantum prediction circuit to infer a next data point in the time-sequential sequence following the subset of the time-sequential sequence represented by the input vector.

The AI quantum predictor of the US '953 patent application is trained via a supervised learning technique to use pattern recognition to predict a "next" data point in a time-sequential sequence of points, even in cases where the point does not yet exist in the real world. The time-sequential data sequence may be any sequence of data points collected in a time-sequential manner including, for example, data points representing weather patterns (e.g., temperature trends), economics data, human decision making, etc.

There is a need therefore to develop a method and system which is able to process the parameters relating to the data and obtain insights, such as trends, in a time-efficient manner, requiring fewer computing resources, to enable operators of the systems to take action.

SUMMARY OF THE INVENTION

This document teaches a computer-implemented method and system for identifying trends in a network of elements. The method comprises obtaining a plurality of properties for the elements in the network, creating a multi-dimensional configuration space from the measured plurality of properties and storing the multi-dimensional configuration space in data storage. A cost function which is representative of the trends in the network is then built and the cost function is passed to a quantum processor for solving to identify a minimum in the cost function. The identified minimum is processed extract in a central processing unit the trends from the identified minimum. The cost function has one or more components which are representative of interaction between different elements in the network.

The use of the quantum processor enables the calculation of the minima in the cost function to be carried out much faster than using conventional computers and enables more factors to be considered. In one aspect, the quantum processor is a quantum annealing processor.

The solving of the cost function comprises a step of creating a tensor network and iteratively updating coefficients of tensors in the tensor network. The iterative updating concludes when all of the coefficients of the tensors have been updated at least once, after a predefined number of iterations, or after reaching a convergence criterion.

The elements of the network can be participating users in a social media network, economic parameters in a financial system, or sensors in an industrial network.

The system for identifying trends in a network of elements comprises a plurality of input/output devices for obtaining a plurality of properties for the elements in the network, a data storage unit for storing a multi-dimensional configuration space from the plurality of properties), a central processing unit for building a cost function representative of the trends in the network, and a quantum processor for receiving the cost function from the central processing unit and solving the cost function to identify a minimum in the cost function.

DESCRIPTION OF THE FIGURES

For a more complete understanding of the present invention and the advantages thereof, reference is now made to the following description and the accompanying drawings, in which.

DETAILED DESCRIPTION OF THE INVENTION

The invention will now be described with reference to the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figure 1:
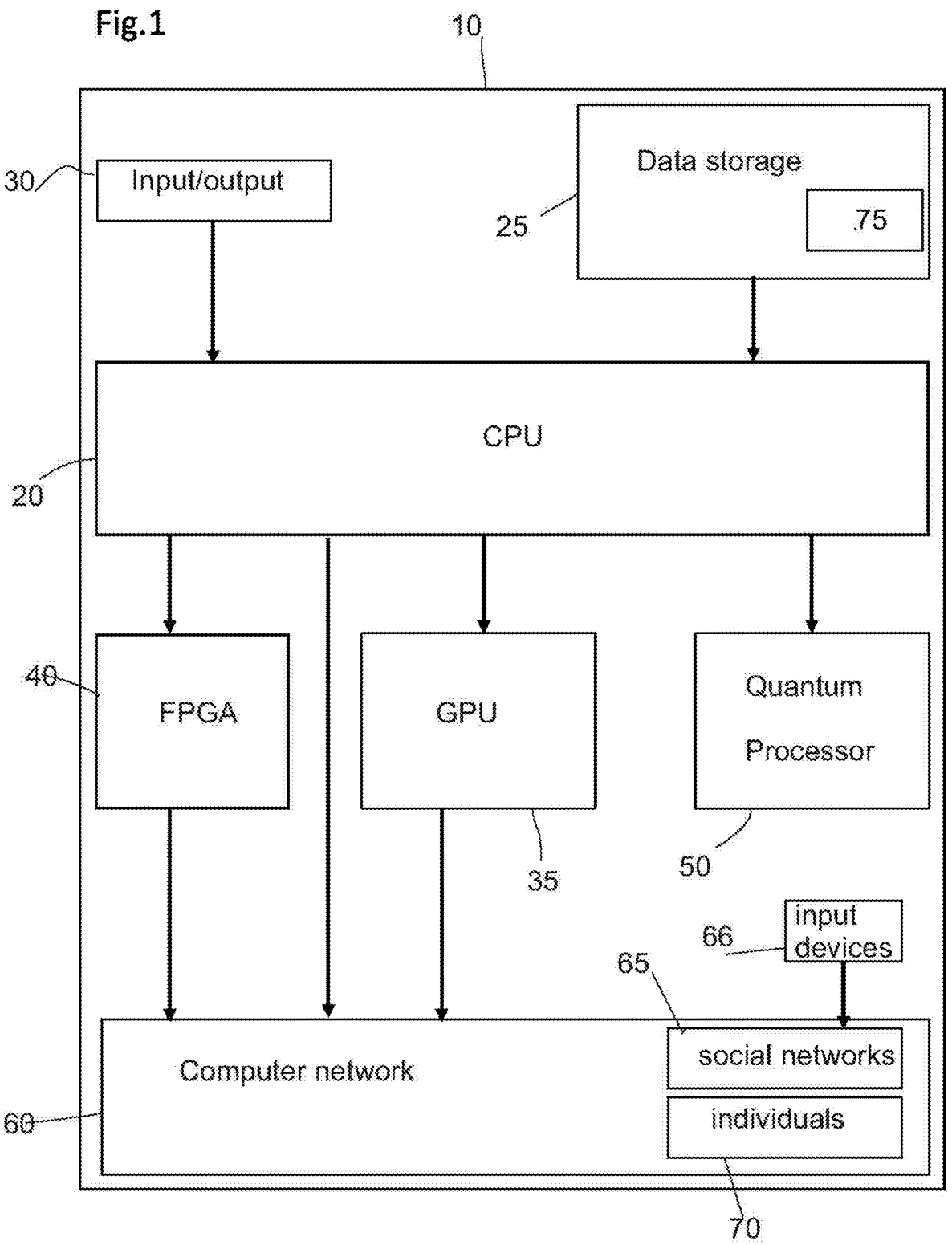
FIG. 1 shows an overview of a computing system for implementing the method of this document.

FIG. 1 shows an overview of a computing system 10 for implementing the method of this document. The computing system 10 is a hybrid quantum and classical system and comprises, in an example, a central processing unit 20 which is connected to a data storage unit 25 (i.e., one or more memory devices), and input/output devices 30. A graphics processing unit 35 for processing vector calculations and a field programmable gate array (FGPA) 40 for control logic are connected to the central processing unit 20. A quantum processor 50 (also termed quantum accelerator) is connected to the central processing unit 20.

In one implementation of the computing system 10, the quantum processor 50 can be a quantum annealing system, such as one supplied by D-Wave, but this is not limiting of the invention. The computing system 10 is connected to a computer network 60, such as the Internet. It will be appreciated that the computing system 10 of FIG. 1 is merely exemplary and other units or elements may be present in the computing system 10. It will also be appreciated that there may be many input/output (I/O) devices 30 located at multiple locations and that there may be a plurality of data storage units 25 also located at multiple locations. The many I/O devices and data storage units 25 are connected by the computer network 60.

The computer network 60 is accessed by a large number of users 70 through, for example, their personal computers, smartphones and/or tablets.

Figure 2:
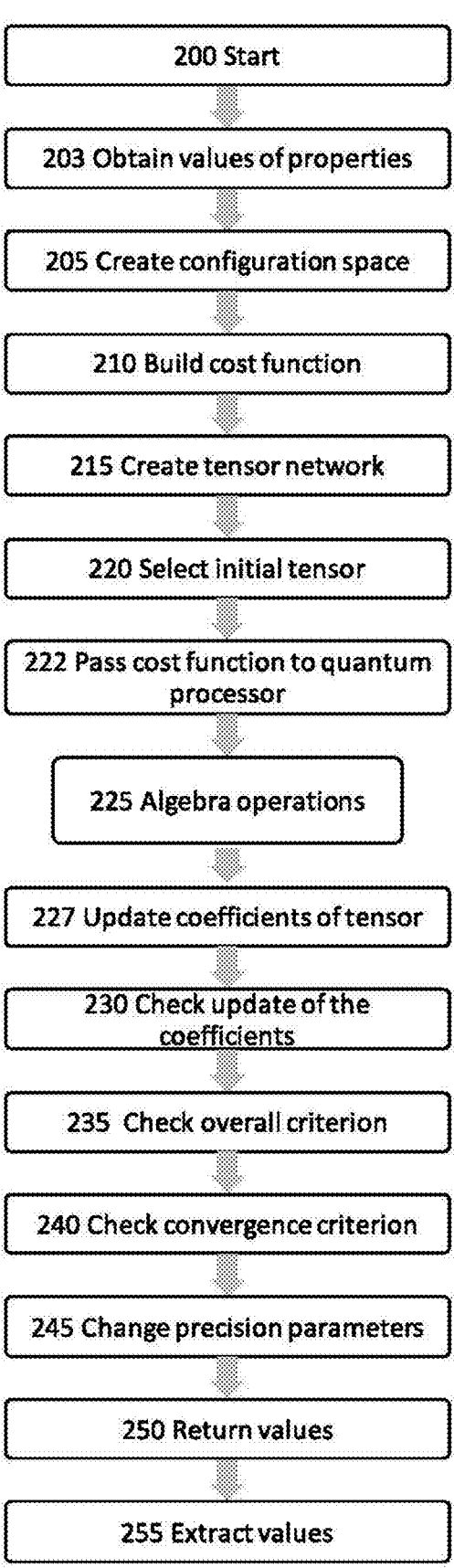
FIG. 2 shows an overview of the method of this document.

FIG. 2 shows a flow diagram of the implementation of the method of this application. The application will be described with respect to a method of determining trends in a social network 65 which is part of or can be accessed from the computer network 60. One non-limiting example of the social network 65 is a social media network, such as but not limited to Twitter, Facebook, Instagram, etc., in which a large number of the individuals 70 participate using their input devices 66.

The method starts at step 200 and, in an initial step 203, a plurality of values relating to the participating individuals 70 is gathered. A multi-dimensional configuration space 75 is defined for the participating individuals 70. In this example, the participating individuals 70 form the points of the configuration space 75. The multi-dimensional configuration space 75 includes a plurality of properties for the points. This configuration space 75 is stored in one or more of the data storage units 25 and indeed multiple copies of the configuration space 75 may be stored in different ones of the data storage units 25 or spread across different data storage units 25. Values relating to the participating individuals 70 are already obtained in step 203 and placed in this configuration space 75 with differing values for differing properties of the individuals 70 according to their activities in the social network 65.

The configuration space 75 has a plurality of different axes, whereby the different axes corresponding to different properties of the individuals 70 in the social network 65. Extreme points of these axes correspond to opposite trends. For the sake of simplicity, let us consider for the time being a simple binary case, say, "black-white" or "democrat-republican". These exemplary binary values represent the properties of the individuals. The individuals 70 (denoted by i in the following equations) have their own (personal) ideological configuration space, and their ideological preferences define the point on this configuration space 75. This "state" of the personal ideological configuration space is influenced by many factors, such as likes and dislikes of statements in the social networks 65 by other ones of individuals 70 (denoted by j in the following equations) in the social networks 65. The state of the personal ideological configuration space can also be influenced by external factors. Such external factors include, but are not limited to political scandals, wars, and economic crises.

This configuration space 75 can be modelled by a cost function. Let us assign a two-dimensional vector $\vec{S}_i$ to the I users 70 participating in the social network 65. The two-dimensional vector $\vec{S}_i$ has a unit length which is given by the Equation 1:

$$\vec{S}_i = \cos\theta_i \cdot \hat{e}_1 + \sin\theta_i \cdot \hat{e}_2$$

in which $\theta_i \in [0, 2\pi]$ and $\hat{e}_1$, $\hat{e}_2$ are two orthonormal vectors. The vector is normalized to one (i.e., $\vec{S}_i = 1$), and the angle $\theta_i$ parametrizes the position of the participating i users 70 in a single-axis ideological space.

It is now possible to build a cost function in step 210 which to be is minimized by a configuration that globally satisfies as much as possible all constraints of the equation in the social network 65 and provides information about trends in the network 60. The cost function is built in the central processing unit 20.

The first term of the cost function takes into account the external influence environment of the participating users 70. There can be positive influence on the users 70, i.e., ideological alignment, as well as negative influence, i.e., ideological disalignment. This positive and/or negative influence is modelled via two-variable terms tending to align/anti-align vectors. Let us term $P_i$ and $N_i$ as the sets of respectively the positive influencers and the negative influences on the individual i. This first element of the cost function $C_1$ is then given by Equation 2:

$$C_1 = -\sum_{i,j \in P_i} \vec{S_i} \cdot \vec{s_j} + \sum_{i,j \in N_i} \vec{S_i} \cdot \vec{s_j}$$

This first term of the cost function $C_1$ will be internally correlated since the different sets $P_i$ and $N_i$ partially overlap amongst different ones of the participating individuals i as many of the participating individuals will be influenced both positively and negatively by other ones of the participating individuals j.

In a further aspect of the disclosures, it is possible to include in Equation 2 further terms in the cost function to enable the polarization of specific trends. Examples include so-called "a priori trends" for one of the users i. These are trends that are not influenced by the other ones of the participating users j in the social network 65 but are due to other individual polarising factors. These other individual factors include, but are not limited to, the i user's past experiences and opinions on other subjects uninfluenced by the other participating users j. The cost function $C_2$ for the priori trends is given by Equation 3:

$$C_2 = -\sum_i \vec{h_i} \cdot \vec{S_i}$$

in which $\vec{h_i}$ represents the polarising factors. It will be appreciated that for those individuals with a fixed trend, the vector $\vec{S_i}$ is not a variable but has a fixed set of parameters in the configuration space 75.

More generally all the information present in the social network 65 can be codified in the cost function of Equation 4:

$$C = C_1 + C_2 + C_3$$

in which $C_3$ represents any further external factors affecting the trends.

There is now a need to identify the configuration minimising this cost function C. The factors of the individual elements of the cost function which will correspond to the most reasonable trends in the network.

The calculation of the cost function is a linear algebra problem and, with a conventional processor, such as the central processing unit 20, the graphics processing unit 35 and/or the FPGA 40 (or a combination of them) is challenging because this is an NP problem (nondeterministic polynomial problem) in which the calculation time for the linear algebra problem is an exponential function of the number of variables that need to be calculated.

In other words, for a small number of dimensions it would be possible to calculate the minimum of the cost result within a reasonable amount of time. However, conventional computers will require significant amounts of time for larger numbers and cannot do this calculation in "real time" which is required for a trend analysis. It is therefore necessary to solve the linear algebra algorithms using quantum linear algebra algorithms, such as variational quantum single value decompositions, QM/MM, quantum-ED (exact diagonalization) or quantum principal components analysis.

Having created the configuration space in 205 and the cost function in step 210, the next step 215 is to create an initial tensor network in the central processing unit 20 and stored in the data storage unit 25 using the central processing unit 20. The tensor network is a representation of a vector in the multidimensional configuration space 75 which is spanned by all possible configurations of the variables relating to the users 70. A matrix product state can be used to represent the tensor network.

An initial tensor (labelled t) is selected in step 220 from the tensor network created in the previous step 215. The selection 220 of the initial tensor t is arbitrary. It may the first one of labelled tensors. For instance, in a one-dimensional tensor network, in which the tensors are arranged linearly along a line, the selection could be from one boundary or end of the line to the other boundary.

The coefficients of the tensor t then need to be updated in step 227 such as way such that the value of the cost function C (Equation 4) established in step 210 is minimised. An updating of the coefficients of the tensor t is done by passing the cost function in step 222 to the quantum processor 50 and carrying out the linear algebra operations in step 225 in the quantum processor 50 to identify a minimum, as discussed above.

The linear algebra operations are carried out using a density matrix renormalization group (DMRG) algorithm to find the lowest energy eigenstate of the Hamiltonian representing the tensor network. The operation in step 225 proceeds by minimizing the expectation value of the Hamiltonian. The expectation value is computed from the matrix product state representing the tensor network.

The linear algebra operations need to be repeated many thousands of times in order to update in step 227 the coefficients of the tensor. After a specified number of operations, at step 230 a check is made—called a sweep, in which a check is carried out to see whether all of the coefficients in the tensors of the tensor network have been updated sequentially, for example, one or twice. If this sweep criterion is not fulfilled, then the tensor t still needs to be updated and proceeds back to step 235 to carry out further linear algebra operations.

Once the sweep criteria are checked in step 230, a check is carried out in step 235 on the tensor t to see whether an overall criterion has been fulfilled. This overall criterion is typically whether the system has reached a pre-defined number of iterations in step 225 or whether certain ones of the tensor parameters have reached a predefined convergence. If this overall criterion is not fulfilled in step 235 then the method continues updating the coefficients in step 230.

Finally in a following step 240 a check is carried out to see if the method has reached global predefined convergence criteria. The global convergence criteria are chosen so that the current result of the tensor t should be close to a near-optimal solution of the optimization problem for the cost function. Depending on the result of this step 240, then the computing system 10 can change in step 245 precision parameters of the method. These precision parameters could be bond dimensions of the tensor network, unit cell of the tensor network, number of iterations in the previous steps, Trotter-step in imaginary-time evolution, error tolerance in the linear algebra subroutines, etc. In most cases, only those parameters of the tensor network are modified. The steps of the method from step 225 are repeated with the modified precision parameters.

If the criteria check in step 240 is successful, then the method continues and provides an output that corresponds to a proposed configuration with the solution of the variables of the cost function C. These variables correspond to the trends in the social network 65.

Another approach to identifying trends in data will now be explained.

In this approach, the cost function C is discretized so that the formulation only includes binary variables. in this case the values of cos $\theta_i$ and sin $\theta_i$ are written as follows:

$$\cos\theta_i = \sum_{a=0}^{n} x_{i,a} 2^{-a}$$

and $$\sin\theta_i == \sum_{a=0}^{n} y_{i,a} 2^{-a}$$

in which $x_{i,a}$ and $y_{i,a}$ are the classical bit variables for i, and a=1, 2 . . . , n.

To fulfil the constraint that $(\cos\theta_i)^2+(\sin\theta_i)^2=1$, it is necessary to add the penalty term:

$$C_i = \left(\left(\sum_{a=1}^{n} x_{i,a} 2^{-a}\right)^2 + \left(\sum_{a=1}^{n} y_{i,a} 2^{-a}\right)^2 - 1\right)$$

To fulfil the constraint that $(\cos\theta_i)^2+(\sin\theta_i)^2=1$, it is necessary to add the penalty term:

$$C_i = \left(\left(\sum_{a=1}^{n} x_{i,a} 2^{-a}\right)^2 + \left(\sum_{a=1}^{n} y_{i,a} 2^{-a}\right)^2 - 1\right)$$

which is minimized whet the constrain is satisfied so that $C_i \approx 0$.

The final cost function is a higher order unconstrained binary optimization problem (HUBO) given by:

$$C' = C(x_{i,a}, y_{i,a}) + \gamma \sum_{i} C_i$$

in which $\gamma > 1$.

This above cost function can be optimized using Noisy Intermediate-Scale Quantum (NISQ) devices as the quantum processor. This optimization is done for instance by implementing a Variational Quantum Eigensolver (VQE) algorithm, which minimizes the function via (say) gradient descent using a quantum circuit ansatz that can contain different amounts and structure of quantum entanglement as well as variational parameters. This option can be implemented using a variety of quantum hardware architectures, such as superconducting qubits, trapped ions, and neutral atoms. Additionally, other optimization quantum algorithms would be possible, such as the Quantum Approximate Optimization Algorithm (QAOA), as well as quantum annealing on current superconducting quantum annealing devices.

Other Applications

The method listed above can be used in other applications, such as financial methods, including trends in stock markets or electricity demands, or identifying trends in sensor readings. For example, predictive maintenance of machines in an operating plant by can be calculated using the method outlined in this application. In a further aspect, it would be possible to use the method to predict patient outcomes and potential health crises.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto and their equivalents. The entirety of each of the aforementioned documents is incorporated by reference herein.

REFERENCE NUMERALS

10 Computing system
20 Central processing unit
25 Data storage
30 Input/output devices
35 Graphics processing unit
40 Field programmable gate array
50 Quantum processor
55 Input devices
60 Computer network
65 Social Network
70 Individuals
75 Configuration space

What is claimed is:

1. A computer-implemented method for identifying trends in a network of elements with a hybrid quantum and classical system having a classical central processing unit and a quantum processor, comprising:

obtaining, in the classical central processing unit, a plurality of properties for the elements in the network, wherein the elements of the network are participating users in a social media network or sensors in an industrial network;

creating, in the classical central processing unit, a multi-dimensional configuration space from the obtained plurality of properties and storing the multi-dimensional configuration space in data storage;

building, in the classical central processing unit, a cost function modelling the multi-dimensional configuration space and representative of the trends in the network;

passing the cost function to the quantum processor;

solving the cost function in the quantum processor to identify a minimum, wherein the solving of the cost function comprises a step of creating a tensor network and iteratively updating coefficients of tensors in the tensor network, wherein the quantum processor comprises a plurality of qubits implemented using a superconducting, trapped-ion, or neutral-atom quantum hardware architecture, and the cost function is minimized by executing a quantum optimization algorithm on the qubits;

returning the identified minimum from the quantum processor to the classical central processing unit; and extracting in the classical central processing unit the trends from the identified minimum.

2. The method of claim 1, wherein the cost function has one or more components, and wherein at least one of the components is representative of interaction between different elements in the network.

3. The method of claim 1, wherein the iterative updating concludes when all of the coefficients of the tensors have been updated at least once.

4. The method of claim 1, wherein the iterative updating concludes after a predefined number of iterations.

5. The method of claim 1, wherein the iterative updating concludes after reaching a convergence criterion.

6. The method of claim 1, further comprising changing precision parameters of the tensor network.

7. A non-transitory medium having stored thereon instructions that, when executed by a processor, cause the processor to perform the method of claim 1.

8. The method according to claim 1 for predictive maintenance of machines, prediction of health crises or monitoring of financial markets.

9. A hybrid system for identifying trends in a network of elements, wherein the elements are ones of individuals in a social media network or sensors in a machine, comprising:

a plurality of input/output devices for obtaining a plurality of properties for the elements in the network;

a data storage unit for storing a multi-dimensional configuration space from the plurality of properties;

a classical central processing unit configured for building a cost function modelling the multi-dimensional configuration space and representative of the trends in the network; and a quantum processor configured for receiving the cost function from the classical central processing unit and solving the cost function to identify a minimum in the cost function, wherein the solving of the cost function comprises a step of creating a tensor network and iteratively updating coefficients of tensors in the tensor network, wherein the quantum processor comprises a plurality of qubits implemented using a superconducting, trapped-ion, or neutral-atom quantum hardware architecture, and the cost function is minimized by executing a quantum optimization algorithm on the qubits; and for returning the identified minimum to the classical central processing unit, wherein the classical central processing unit is further configured to extract the trends from the identified minimum.

10. The system of claim 9, wherein the quantum processor is a quantum annealing processor.

* * * * *